United States Patent [19]
Consolazio et al.

[11] Patent Number: 6,141,538
[45] Date of Patent: Oct. 31, 2000

[54] TRANSMIT DETECTION CIRCUIT

[75] Inventors: Stephen James Consolazio, Arlington Heights; David Biscan, Mundelein, both of Ill.

[73] Assignee: Northrop Grumman Corporation, Los Angeles, Calif.

[21] Appl. No.: 09/034,894

[22] Filed: Mar. 3, 1998

[51] Int. Cl.[7] .................................... H04B 1/00
[52] U.S. Cl. .......................... 455/68; 455/69; 455/70; 455/118; 455/14
[58] Field of Search .................... 455/68, 14, 69, 455/70, 86, 126, 522, 523, 3.1, 103, 127, 15, 118, 83; 375/298

[56] References Cited

U.S. PATENT DOCUMENTS

| | | | |
|---|---|---|---|
| 3,743,933 | 7/1973 | Preti | 325/24 |
| 3,848,189 | 11/1974 | Pope | 324/94 |
| 3,887,872 | 6/1975 | Sharpe | 325/21 |
| 4,099,024 | 7/1978 | Boggs et al. | 178/71 |
| 4,704,733 | 11/1987 | Kawano | 455/16 |
| 4,742,354 | 5/1988 | Wen et al. | 455/86 |
| 4,907,291 | 3/1990 | Yamamoto | 455/78 |
| 4,914,714 | 4/1990 | Tamura | 455/78 |
| 4,982,442 | 1/1991 | Sarokhanian | 455/83 |
| 5,047,668 | 9/1991 | Bosenberg | 359/330 |
| 5,153,596 | 10/1992 | Stove | 342/175 |
| 5,212,812 | 5/1993 | Dutton | 455/73 |
| 5,291,290 | 3/1994 | Vaughan et al. | 455/103 |
| 5,293,633 | 3/1994 | Robbins | 455/3.1 |
| 5,400,173 | 3/1995 | Komine | 359/330 |
| 5,502,715 | 3/1996 | Penny | 370/26 |
| 5,566,359 | 10/1996 | Corrigan | 455/78 |
| 5,579,306 | 11/1996 | Dent | 455/68 |
| 5,604,924 | 2/1997 | Yokoya | 455/68 |
| 5,956,373 | 9/1999 | Goldston et al. | 375/298 |
| 5,956,627 | 9/1999 | Goos | 455/127 |

FOREIGN PATENT DOCUMENTS 2252840  8/1992  United Kingdom.

Primary Examiner—Daniel S. Hunter
Assistant Examiner—Alan T. Gantt
Attorney, Agent, or Firm—Terry J. Anderson; Karl J. Hoch, Jr.

[57] ABSTRACT

A method and a circuit for detecting transmission of a radio frequency (RF) signal and generating control signals to regulate the operation of a RF converter remotely located from a corresponding transmitter are disclosed. The method comprises the following steps: (a) sensing the direction of a RF signal flowing in an RF transmission line, at a location proximate of the RF converter; (b) generating a low-power RF signal in response to the sensed direction; and (c) transforming the low-power RF signal into a control signal to regulate the operation of the RF converter.

25 Claims, 2 Drawing Sheets

TRANSMIT DETECTION CIRCUIT

FIELD OF THE INVENTION

The present invention relates generally to methods and systems for detecting transmission of a radio frequency (RF) signal, and more particularly to a method and a circuit for detecting transmission of a RF signal and generating control signals to regulate operation of a RF converter remotely located from a corresponding transmitter.

BACKGROUND OF THE INVENTION

In microwave communications systems and other wireless communications systems, a RF converter is used for frequency translation and power amplification of transmitted and received RF signals. When a RF signal is transmitted by a radio transceiver, a control signal is sent from the transceiver to the RF converter. Upon reception of the control signal, the RF converter switches to the transmit mode, i.e., it supplies direct current (DC) power to its transmit amplifiers and disable its amplifiers in the receive chain. The RF converter also performs frequency up-conversion, i.e., it translates the RF signal from the signal intermediate frequency band to an assigned transmit frequency band before sending the RF signal to an antenna for transmission. Upon termination of the control signal from the transceiver, the RF converter switches back to the receive mode, i.e., it supplies direct current (DC) power to its receive amplifiers and disable its amplifiers in the transmit chain. When a RF signal is received via the antenna, the RF converter amplifies and down-converts the RF signal from the receive frequency band to an intermediate frequency band for further processing by the transceiver.

The antenna is usually connected to the RF transceiver by a coaxial cable. It is desirable to locate the RF converter near the antenna in order to reduce noise in the received RF signals, and to minimize transmitted signal power loss in the coaxial cable.

However, by placing the RF converter atop an antenna tower, remotely from the base station radio unit, the RF converter does not have access to the radio unit control signals, unless it is connected to the base station radio unit by a wire, in addition to the coaxial cable. Wire connection would cause other problems to the system. Thus, the RF converter, if located remotely from the base station radio unit, must be able to generate its own control signals. There is presently a need for a circuit which, when implemented as an integral part of the RF converter, allows the RF converter to sense when the base station radio unit is transmitting and to generate its own control signals so that it can switch between the transmit and receive modes in unison with the base station radio unit.

SUMMARY OF THE INVENTION

A method and a circuit for detecting transmission of a radio frequency (RF) signal and generating control signals to regulate the operation of a RF converter remotely located from a corresponding transmitter are disclosed. The method comprises the following steps: (a) sensing the direction of a RF signal flowing in an RF transmission line, at a location proximate of the RF converter; (b) generating a low-power RF signal in response to the sensed direction; and (c) transforming the low-power RF signal into a control signal to regulate the operation of the RF converter.

Steps (a) and (b) of the disclosed method are performed using a directional coupler. The power of the low-power RF signal produced by the directional coupler depends on the direction of the RF signal being sensed. This power is much greater when the sensed RF signal is leaving the transmitter than when it is entering the transmitter.

Step (c) of the disclosed method comprises the following steps: (1) rectifying the low-power RF signal to produce a rectified signal; (2) filtering the rectified signal to produce a lowpass signal; and (3) amplifying the lowpass signal to produce a direct current (DC) signal; (4) comparing the DC signal with a reference level, the reference level being set as to differentiate between a RF transmitted signal and a RF received signal; and (5) generating a control signal when the DC signal is greater than the reference level, to indicate that the sensed RF signal is being transmitted.

The transmit detection circuit of the present invention comprises (a) a directional coupler; (b) a rectifier; (c) a lowpass filter; (d) an amplifier; and (e) a comparator.

The directional coupler senses a RF signal flowing in the RF transmission line, which is in electrical communication with the transmitter, and generates a low-power RF signal. The power of this low-power RF signal depends on the direction of the sensed RF signal. This power is much greater when the sensed RF signal is leaving the transmitter than when it is entering the transmitter. In the preferred embodiment of the invention, the difference of power between the two low-power RF signals of the two cases is nominally 20 dB. This large difference between the two signals will enable the comparator to decide whether the sensed RF signal is a transmitted or received signal.

The rectifier rectifies the low-power RF signal to produce a rectified signal. The rectifier can be implemented with a diode.

The lowpass filter processes the rectified signal to produce a weak lowpass signal. The lowpass filter can be implemented with a capacitor.

The amplifier amplifies the weak lowpass signal to produce a DC signal. This amplifier can be implemented with an inverting operational amplifier.

The comparator receives the DC signal and a reference level at its two inputs. When the DC signal is higher than the reference level, the comparator outputs a control signal. The control signal, which indicates that the sensed RF signal is leaving the transmitter, is used to regulate the operation of the RF converter.

Upon reception of the control signal, the RF converter enters the transmit mode. When the transmitter stops transmitting, the low-power RF signal is no longer present at the rectifier diode, so there is no rectified voltage to charge the filter capacitor. The relatively low input impedance of the amplifier, about 10 kiloohms, will allow the charge to bleed off the filter capacitor. As the voltage of the filter capacitor drops, there is a corresponding drop in the amplifier output voltage. When the amplifier output voltage drops below the threshold of the comparator, the comparator changes state and the comparator output changes its logic state. This causes the RF converter to enter the receive mode. Thus, when the transmitter stops transmitting, the RF converter switches back to the receive mode.

With the transmit detection circuit of the present invention, the RF converter can switch between transmit and receive modes in unison with the transmitter.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE INVENTION

The detailed description set forth below in connection with the appended drawings is intended as a description of the presently preferred embodiment of the invention, and is not intended to represent the only form in which the present invention may be constructed or utilized. The description sets forth the functions and the sequence of the steps for constructing and operating the invention in connection with the illustrated embodiment. It is to be understood, however, that the same or equivalent functions may be accomplished by different embodiments that are also intended to be encompassed within the spirit and scope of the invention.

Figure 1:
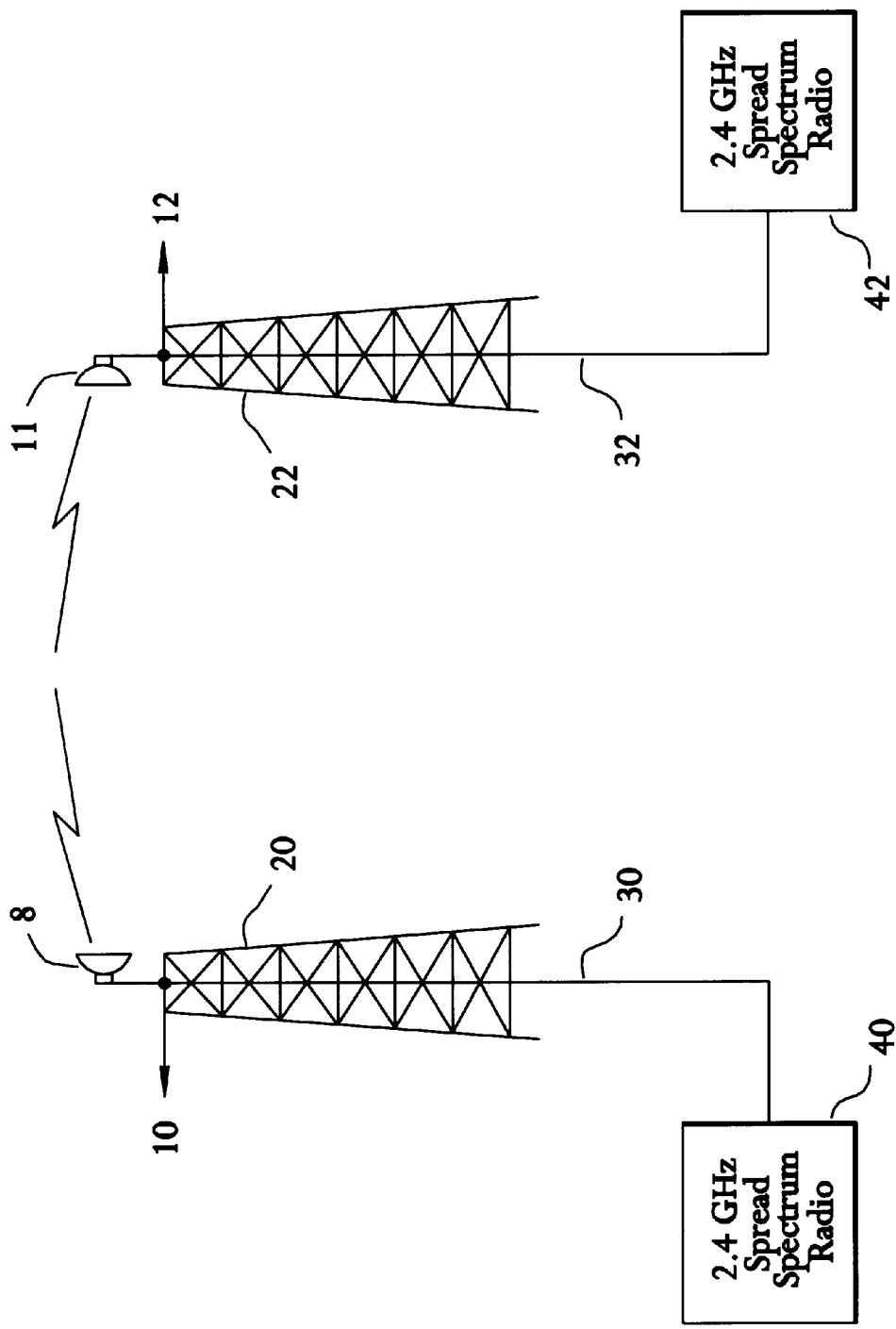
FIG. 1 illustrates an application of the present invention.

The present invention discloses a novel circuit for detecting transmission of a RF signal. Transmit detection can be used to generate control signals in applications where they are not directly available from the transmitter. An example of such an application is a radio frequency converter which is not contained within the base station radio unit, as illustrated in FIG. 1. The circuit of the present invention, when employed in an antenna tower-mounted frequency converter, will facilitate such point-to-point radio link application.

Referring to FIG. 1, the RF converter 10 is mounted atop or near the top of the antenna tower 20 which supports the antenna 9. The RF converter 10 is connected to the base station radio unit 40 only by a coaxial cable 30. Thus, the RF converter 10 does not have access to the radio unit 40 control signals, and must be able to generate its own control signals. Implemented as an integral part of the RF converter, the circuit of the present invention allows the RF converter 10 to sense when the radio unit 40 is transmitting and to generate its own control signal so that it can switch between the transmit and receive modes in unison with the radio unit 40. In FIG. 1, the radio unit 40 is shown as a 2.4 GHz spread spectrum radio unit for illustration purpose only. The circuit of the present invention can be tailored to be used with radio units covering other frequency bands.

Similarly, the RF converter 12 is mounted atop the antenna tower 22 which supports the antenna 11. The RF converter 12 is connected to the base station radio unit 42 only by a coaxial cable 32. Thus, the RF converter 12 does not have access to the radio unit 42 control signals, and must be able to generate its own control signals.

Referring to FIG. 1, a RF signal traveling in the coaxial cable 30 can be either a transmitted RF signal or a received RF signal. A transmitted RF signal is a signal flowing from the radio unit 40 to the antenna 9, via the coaxial cable 30 and the RF converter 10. A received RF signal is a signal flowing from the antenna 9 to the radio unit 40 via the RF converter 10 and the coaxial cable 30.

Figure 2:
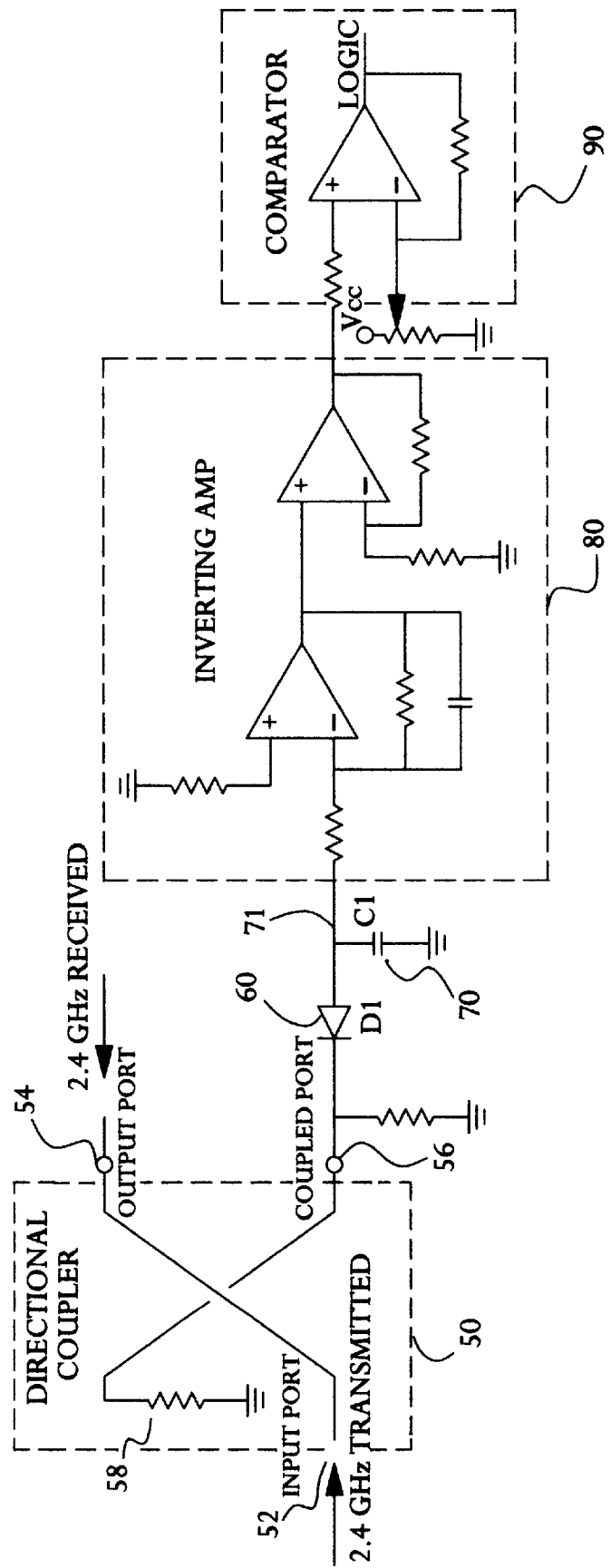
FIG. 2 shows a detailed schematic diagram of the preferred embodiment of the present invention.

FIG. 2 is a schematic diagram of the presently preferred embodiment of the invention. Although the circuit of FIG. 2, as described below, is used for detecting transmission of microwave RF signals, it is understood that the circuit can be easily modified to detect transmisssion of signals in a different range of frequencies. The circuit of FIG. 2 comprises a directional coupler 50, a microwave diode 60, a capacitor 70, an inverting amplifier 80, and a comparator 90.

The directional coupler 50 senses the RF signal flowing in the transmission line 51 which connects port 52 to port 54. This RF signal can be either a transmitted RF wave flowing from port 52 to port 54, or a received RF wave flowing from port 54 to port 52. When the RF signal is a transmitted wave, the directional coupler 50 extracts a small amount of power from the RF signal power and generates a low-power RF signal at its coupled port 56. Although a 3-dB coupler, manufactured by Lange, is used to implement the directional coupler 50, it causes only a small loss, and not a 3-dB loss, of the transmitted RF signal power because, by design, it is not used at its optimum frequency. The Lange 3-dB coupler is preferably used, due to its well-known characteristics. When the RF signal is a received wave, the directional coupler 50 also extracts a small amount of power from the RF signal power, but a proper load resistance 58 can balance the wave voltage induced into the directional coupler such that the low-power RF signal appearing at the coupled port 56 is nominally 20 dB below the one induced by a transmitted RF wave. The large difference of power between these two signals enables the circuit of FIG. 2 to sense whether the RF signal flowing in transmission line 51 is a transmitted signal or a received signal.

The low-power RF signal at the coupled port 56 is rectified by the microwave diode 60, resulting in a negative, half-wave rectified voltage which is subsequently filtered by the capacitor 70. The resulting signal at point 71 is a weak lowpass or direct current signal. This weak lowpass signal is then amplified by the inverting operational amplifier 80 to produce a stronger DC signal. The DC signal at the output of the inverting amplifier 80 is then applied to the positive input of the comparator 90. A reference level is applied to the negative input of the comparator 90. The comparator 90 output is a fixed positive voltage, corresponding to logic state "1", when the DC signal is higher than the reference level, and a fixed negative voltage, corresponding to logic state "0", when the DC signal is smaller than the reference level. The comparator 90 output is used as the control signal to a RF converter.

The reference level is predetermined and set between the two DC levels that are derived from a RF received signal and a RF transmitted signals, respectively. The voltage difference between these two DC levels is large, due to the large difference of power between the two corresponding RF signals at the coupled port 56. The reference level is set high enough so that a DC signal resulting from sensing a RF received signal will not cause the comparator 90 output to change its logic state. A DC signal resulting from sensing a transmitted RF signal is higher than the reference level, thus will cause the comparator 90 output to change its logic state and the RF converter to enter the transmit mode.

When the transmitter stops transmitting, the low-power RF signal is no longer present at the coupled port 56 and at the rectifier diode 60, so there is no rectified voltage to charge the filter capacitor 70. The relatively low input impedance of the amplifier 80, about 10 kiloohms, will allow the charge to bleed off the filter capacitor 70. As the voltage of the filter capacitor 70 drops, there is a corresponding drop in the amplifier 80 output voltage. When the amplifier 80 output voltage drops below the threshold of the comparator 90, the comparator 90 changes state and the comparator 90 output changes its logic state. This causes the RF converter to enter the receive mode. Thus, when the transmitter stops transmitting, the RF converter switches back to the receive mode.

It is understood that the exemplary transmit detection circuit described herein and shown in the drawing represent only a presently preferred embodiment of the invention. Indeed, various modifications and additions may be made to such embodiment without departing from the spirit and scope of the invention. Those skilled in the art will recognize that various other configurations are equivalent and therefore likewise suitable. For example, the circuit of FIG. 2 can be modified to detect transmission of RF signals other than microwave signals. Thus, these and other modifications and additions may be obvious to those skilled in the art and may be implemented to adapt the present invention for use in a variety of different applications.

What is claimed is:

1. A method for generating a converter control signal to regulate transmission mode of a remotely located radio frequency (RF) converter in radio communication with a radio transceiver via an RF transmission line, the method comprising the steps of:
   (a) sensing flow direction of an RF signal flowing in an RF transmission line, at a location proximate of the RF converter;
   (b) generating a first RF signal in response to said sensed direction; and
   (c) generating a converter control signal in response to the first RF signal to regulate transmission mode of said RF converter.

2. The method as recited in claim 1 wherein steps (a) and (b) are performed using a directional coupler.

3. The method as recited in claim 1 wherein step (c) comprises the steps of:
   (1) rectifying the first RF signal to produce a rectified signal;
   (2) filtering the rectified signal to produce a lowpass signal; and
   (3) amplifying the lowpass signal to produce a direct current (DC) signal;
   (4) comparing the DC signal with a reference level, the reference level being set as to differentiate between a RF transmitted signal and a RF received signal; and
   (5) generating a converter control signal when the DC signal is greater than the reference level, the control signal indicating that said RF signal is being transmitted.

4. A method for generating a radio system control signal to regulate operation of a radio frequency (RF) system remotely located from a corresponding radio unit transceiver, the method comprising the steps of:
   (a) generating a first signal in response to a RF signal flowing in a RF transmission line, the RF transmission line being in electrical communication with the transceiver, the power of the first signal depending on direction of said RF signal, the power of the first signal being greater when said RF signal is leaving the transceiver than when said RF signal is entering the transceiver;
   (b) transforming the first signal into a direct current (DC) signal;
   (c) comparing the DC signal with a reference level, the reference level being set as to differentiate between a RF transmitted signal and a RF received signal; and
   (d) generating a radio system control signal to regulate the RF system in a transmit mode when the DC signal is greater than the reference level.

5. The method as recited in claim 4 wherein step (b) comprises the steps of:
   (1) rectifying the first signal to produce a rectified signal;
   (2) filtering the rectified signal to produce a lowpass signal; and
   (3) amplifying the lowpass signal to produce said direct current (DC) signal.

6. The method as recited in claim 4 wherein step (a) is performed using a directional coupler.

7. The method as recited in claim 4 wherein step (a) is performed using a 3-decibel (3-dB) directional coupler, said coupler operating at a frequency such that said coupler extracts substantially less than 3 dB of signal power from the RF signal flowing in the RF transmission line.

8. The method as recited in claim 5 wherein the step of rectifying the first signal to produce a rectified signal is performed using a diode.

9. The method as recited in claim 5 wherein the step of filtering the rectified signal to produce a lowpass signal is performed using a capacitor.

10. The method as recited in claim 5 wherein the step of amplifying the lowpass signal to produce the DC signal is performed using an inverting operational amplifier.

11. The method as recited in claim 4 wherein step (c) comprises the step of applying the DC signal and the reference level to inputs of a comparator.

12. The method as recited in claim 4 wherein the RF signal flowing in the RF transmission line is a microwave signal.

13. A transmit detection circuit for a transceiver, the circuit detecting transmission of a radio frequency (RF) signal in an RF transmission line electrically connected to the transceiver, the circuit comprising:
   (a) a directional coupler for generating a first signal in response to an RF signal flowing in the RF transmission line, the power of the first signal depending on direction of said RF signal, the power of the first signal being greater when said RF signal is leaving the transceiver than when said RF signal is entering the transceiver;
   (b) a rectifier in electrical communication with the directional coupler for rectifying the first signal to produce a rectified signal;
   (c) a lowpass filter in electrical communication with the rectifier for filtering the rectified signal to produce a lowpass signal;
   (d) an amplifier in electrical communication with the lowpass filter for amplifying the lowpass signal to produce a direct current (DC) signal; and
   (e) a comparator for comparing the DC signal with a reference level and generating a transmit mode control signal in response to the DC signal being higher than the reference level, the control signal indicating that said RF signal is leaving the transceiver.

14. The transmit detection circuit as recited in claim 13 wherein the rectifier comprises a diode.

15. The transmit detection circuit as recited in claim 13 wherein the lowpass filter comprises a capacitor.

16. The transmit detection circuit as recited in claim 13 wherein the amplifier comprises an operational amplifier.

17. A method for detecting transmission of a radio frequency (RF) signal to regulate operation of an RF system remotely located from a corresponding transmitter, the method comprising the steps of:
   (a) extracting power from an RF transmission line with a 3-decibel (3-dB) directional coupler, the directional coupler being operative to generate a first signal in response to an RF signal flowing in the transmission line, the power of the first signal depending on direction of said RF signal, the power of the first signal being greater when said RF signal is leaving the transmitter than when said RF signal is entering the transmitter, the coupler operating at a frequency such that said coupler extracts substantially less than 3-dB of signal power from the RF signal flowing in the transmission line;

(b) transforming the first signal into a direct current (DC) signal;

(c) comparing the DC signal with a reference level, the reference level being set as to differentiate between an RF transmitted signal and an RF received signal; and (d) generating a control signal when the DC signal is greater than the reference level, the control signal indicating that said RF signal is leaving the transmitter.

18. A method for detecting transmission of a radio frequency (RF) signal to regulate operation of an RF system remotely located from a corresponding transmitter, the method comprising the steps of:

(a) generating a first signal in response to an RF signal flowing in an RF transmission line, the RF transmission line being in electrical communication with the transmitter, the power of the first signal depending on direction of said RF signal, the power of the first signal being greater when said RF signal is leaving the transmitter than when said RF signal is entering the transmitter;

(b) rectifying the first signal with a diode rectifier to produce a rectified signal, filtering the rectified signal to produce a lowpass signal, and amplifying the lowpass signal to produce a direct current (DC) signal;

(c) comparing the DC signal with a reference level, the reference level being set as to differentiate between an RF transmitted signal and an RF received signal; and (d) generating a control signal when the DC signal is greater than the reference level, the control signal indicating that said RF signal is leaving the transmitter.

19. A method for detecting transmission of a radio frequency (RF) signal to regulate operation of an RF system remotely located from a corresponding transmitter, the method comprising the steps of:

(a) generating a first signal in response to an RF signal flowing in an RF transmission line, the RF transmission line being an electrical communication with the transmitter, the power of the first signal depending on direction of said RF signal, the power of the first signal being greater when said RF signal is leaving the transmitter than when said RF signal is entering the transmitter;

(b) rectifying the first signal to produce a rectified signal, filtering the rectified signal with a capacitor to produce a lowpass signal, and amplifying the lowpass signal to produce a direct current (DC) signal;

(c) comparing the DC signal with a reference level, the reference level being set as to differentiate between an RF transmitted signal and an RF receive signal; and (d) generating a control signal when the DC signal is greater than the reference level, the control signal indicating that said RF signal is leaving the transmitter.

20. A method for detecting transmission of a radio frequency (RF) signal to regulate operation of an RF system remotely located from a corresponding transmitter, the method comprising the steps of:

(a) generating a first signal in response to an RF signal flowing in an RE transmission line, the RF transmission line being in electrical communication with the transmitter, the power of the first signal depending on direction of said RF signal, the power of the first signal being greater when said RF signal is leaving the transmitter than when said RF signal is entering the transmitter;

(b) rectifying the first signal to produce a rectified signal, filtering the rectified signal to produce a lowpass signal and amplifying the lowpass signal with an inverting operational amplifier to produce a direct current (DC) signal;

(c) comparing the DC signal with a reference level, the reference level being set as to differentiate between an RF transmitted signal and an RF received signal; and (d) generating a control signal when the DC signal is greater than the reference level, the control signal indicating that said RF signal is leaving the transmitter.

21. A method for detecting transmission of a microwave signal to regulate operation of a microwave system remotely located from a corresponding transmitter, the method comprising the steps of:

(a) generating a first signal in response to a microwave signal flowing in a microwave transmission line, the transmission line being in electrical communication with the transmitter, the power of the first signal depending on direction of said microwave signal, the power of the first signal being greater when said microwave signal is leaving the transmitter than when said microwave signal is entering the transmitter;

(b) transforming the first signal into a direct current (DC) signal;

(c) comparing the DC signal with a reference level, the reference level being set as to differentiate between a transmitted microwave signal and a received microwave signal; and (d) generating a control signal when the DC signal is greater than the reference level, the control signal indicating that said microwave signal is leaving the transmitter.

22. A transmit detection circuit for a transceiver, the circuit detecting transmission of a radio frequency (RF) signal, the circuit comprising:

(a) a directional coupler for generating a first signal in response to an RF signal flowing in an RF transmission line, the RF transmission being in electrical communication with the transceiver, the power of the first signal depending on direction of said RF signal, the power of the first signal being greater when said RE signal is leaving the transceiver than when said RF signal is entering the transceiver;

(b) a rectifying diode in electrical communication with the directional coupler for rectifying the first signal to produce a rectified signal;

(c) a lowpass filter in electrical communication with the diode for filtering the rectified signal to produce a lowpass signal;

(d) an amplifier in electrical communication with the lowpass filter for amplifying the lowpass signal to produce a direct current (DC) signal; and (e) a comparator for comparing the DC signal with a reference level and outputting a control signal in response to the DC signal being higher than the reference level, the control signal indicating that said RF signal is leaving the transceiver.

23. A transmit detection circuit for a transceiver, the circuit detecting transmission of a radio frequency (RF) signal, the circuit comprising:

(a) a directional coupler for generating a first signal in response to an RF signal flowing in an RF transmission line, the RF transmission line being in electrical communication with the transceiver, the power of the first signal depending on direction of said RF signal, the power of the first signal being greater when said RF signal is leaving the transceiver than when said RF signal is entering the transceiver;

(b) a rectifier in electrical communication with the directional coupler for rectifying the first signal to produce a rectified signal;

(c) a lowpass filter capacitor in electrical communication with the rectifier for filtering the rectified signal to produce a lowpass signal;

(d) an amplifier in electrical communication with the capacitor for amplifying the lowpass signal to produce a DC signal; and (e) a comparator for comparing the DC signal with a reference level and outputting a control signal in response to the DC signal being higher than the reference level, the control signal indicating that said RF signal is leaving the transceiver.

24. A transmit detection circuit for a transceiver, the circuit detecting transmission of a radio frequency (RF) signal, the circuit comprising:

(a) a directional coupler for generating a first signal in response to an RF signal flowing in an RF transmission line, the RF transmission line being in electrical communication with the transceiver, the power of the first signal depending on direction of said RF signal, the power of the first signal being greater when said RF signal is leaving the transceiver than when said RF signal is entering the transceiver;

(b) a rectifier in electrical communication with the directional coupler for rectifying the first signal to produce a rectified signal;

(c) a lowpass filter in electrical communication with the rectifier for filtering the rectified signal to produce a lowpass signal;

(d) an operational amplifier in electrical communication with the lowpass filter for amplifying the lowpass signal to produce a DC signal; and (e) a comparator for comparing the DC signal with a reference level and outputting a control signal in response to the DC signal being higher than the reference level, the control signal indicating that said RF signal is leaving the transceiver.

25. A method for regulating a remotely located radio frequency (RF) converter, the RF converter being in RF communication with a radio unit transceiver via an RF transmission line, the method comprising the steps of:

(a) determining flow direction of an RF signal flowing in the RF transmission line at a location proximate the RF converter;

(b) generating a transmit mode RF control signal in response to a determination that the RF signal is flowing from the transceiver and regulating the RF converter in a transmit mode in response to the transmit mode RF control signal;

(c) generating a receive mode RF control signal in response to a determination that the RF signal is flowing toward the transceiver and regulating the RF converter in a receive mode in response to the receive mode RF control signal.

* * * * *